(12) United States Patent
Kanaan et al.

(10) Patent No.: US 7,899,158 B2
(45) Date of Patent: Mar. 1, 2011

(54) METHOD AND APPARATUS FOR MEASUREMENT OF SERVICE DISRUPTION INTERVAL

(75) Inventors: Muzaffer Kanaan, Watertown, MA (US); Stanley Y. Lee, Framingham, MA (US)

(73) Assignees: Verizon Services Organization Inc., Ashburn, VA (US); Verizon Services Corp., Ashburn, VA (US)

( * ) Notice: Subject to any disclaimer, the term of this patent is extended or adjusted under 35 U.S.C. 154(b) by 1226 days.

(21) Appl. No.: 11/507,611

(22) Filed: Aug. 22, 2006

(65) Prior Publication Data
US 2008/0063150 A1    Mar. 13, 2008

(51) Int. Cl.
*H04M 1/24* (2006.01)
*H04B 10/08* (2006.01)
*G01R 31/08* (2006.01)

(52) U.S. Cl. ............................... 379/9; 398/27; 370/244
(58) Field of Classification Search ........... 379/9, 26.01, 379/28; 398/5, 9, 13, 16, 20, 25, 27, 33; 370/241; 714/48, 55, 704, 712
See application file for complete search history.

(56) References Cited

U.S. PATENT DOCUMENTS

| | | | |
|---|---|---|---|
| 6,765,874 B1 * | 7/2004 | Carder et al. | 370/244 |
| 7,313,324 B1 * | 12/2007 | Eslambolchi et al. | 398/17 |
| 7,428,300 B1 * | 9/2008 | Drew et al. | 379/29.09 |
| 2005/0058080 A1 * | 3/2005 | Fiddes et al. | 370/242 |
| 2005/0163053 A1 * | 7/2005 | Paton et al. | 370/241 |
| 2007/0031147 A1 * | 2/2007 | Weiershausen et al. | 398/27 |

* cited by examiner

*Primary Examiner* — Quoc D Tran (57) ABSTRACT

A method and apparatus for measurement of service disruption interval is described. The apparatus may include may included a setting component, a generating component, a first output component, a receiving component, a service disruption start time designator, a settling start time designator, a settling period designator, a service disruption end time designator, a service disruption interval designator, a second output component, and a memory component. In general, a test set consistent with the described embodiments may continuously send test traffic through a network under test ("NUT") and monitor the traffic output from the NUT. The test set may be configured to detect the start of a service disruption and to detect when the service disruption has been cleared. Based on these two pieces of information, the test set may determine and report a service disruption interval.

28 Claims, 8 Drawing Sheets

METHOD AND APPARATUS FOR MEASUREMENT OF SERVICE DISRUPTION INTERVAL

BACKGROUND

Traffic on optical transport networks requires protection. One way to provide protection is to switch the traffic from a "working" path to a "protection" path if the working path is non-functional for any reason. The switching action will generally result in a brief service disruption for the end customer. To implement this type of protection in a service provider's network, it is important to characterize this protection functionality. Many optical transport network standards (such as GR-253 for SONET) have strict requirements on the maximum service disruption interval, and individual service providers and customers may have even more stringent requirements. This makes it imperative that accurate measurements of the service disruption intervals can be obtained.

Some test sets for measuring service disruption intervals use bit errors in monitored test traffic as the basis for disruption interval measurements. In this type of test set, the test set interprets the first detected bit error as an indication that a service disruption has occurred, and starts a timer. This type of test set assumes that the network protection switching has occurred in response to the first bit error. When the test set has received no other bit errors for a given time period, the test set concludes that the service disruption is now over and stops the timer. The test set reports the elapsed time between the first bit error and when the timer is stopped as the service disruption interval. This method for measuring the service disruption interval requires an error-free idle condition before the protection switch action. If, however, the idle condition is not error-free, this can produce inaccurate or invalid service disruption interval results.

DETAILED DESCRIPTION OF THE PREFERRED EMBODIMENTS

A preferred embodiment consistent with the present invention may be implemented in a test set configured to determine a service disruption interval in, for example, a network having an optical line. As a result of various conditions that might occur on the optical line (such as a fiber break or other issues resulting in a signal degradation) a network element may switch the traffic from a "working" line to a "protect" line. The time taken to switch from the working line to the protect line is called the service disruption interval.

Figure 1:
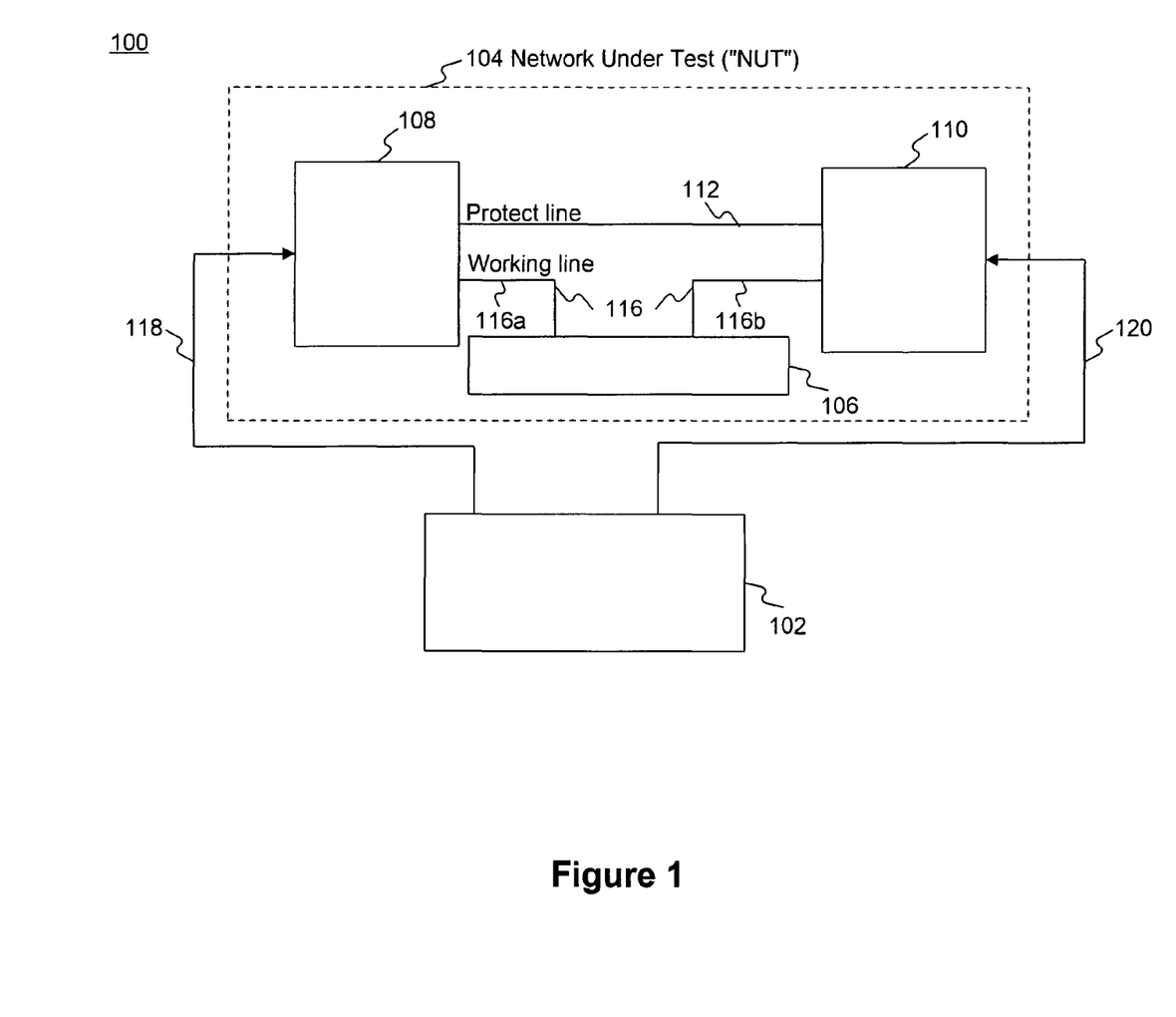
FIG. 1 is a block diagram representation a network under test and test set consistent with a first exemplary embodiment.

FIG. 1 shows a system 100 consistent with a first exemplary embodiment. System 100 may include a first test set 102; communication lines 118 and 120; and a network under test ("NUT") 104, that may include network elements 108 and 110, two optical transmission lines 112 and 116, and a second test set 106. Network elements 108 and 110 may be provisioned such that there is a circuit between them carrying traffic, such as lines 112 and 116. Line 112 may be designated a "protect" line (which may take over carrying traffic when the working line is unavailable for any reason) and line 116 may be designated a "working" line (which generally carries traffic). NUT 104 in FIG. 1 is preferably an optical transport network, such as a metropolitan optical network ("MON") or a long haul optical network ("LHON"). NUT 104 may include other, or additional network components. Examples of other network components include, but are not limited to SONET/SDH add-drop multiplexers, dense wave division multiplexing ("DWDM") terminals and add-drop multiplexers, multi-service provisioning platforms ("MSPPs"), multi-function access devices ("MFADs"), etc. NUT 104 may also be used with other networks, such as networks based on free-space optics.

In the configuration of FIG. 1, first test set 102 is connected to NUT 104 via optical communication lines 118 and 120. However, communication between test set 102 and NUT 104 is not limited to optical transmission lines, and may be performed by any suitable means as is well known, including, but not limited to electrical communication, such as DS-1/DS-3 or 10/100/1000 Gbps Ethernet.

Second test set 106 may be connected to network elements 108 and 110 via working line 116. In an exemplary embodiment, working line 116 may include a first working line portion 116a and a second working line portion 116b. A first end of first working line portion 116a may be connected to an output of network element 108 and a second end of first working line portion 116a may be connected to a first input of second test set 106. Furthermore, a first end of second working line portion 116b may be connected to a first output of second test set 106 and a second end of second working line portion 116b may be connected to an input of network element 110. Second test set 106 may introduce malfunction conditions, such as bit errors into the test traffic of working line 116.

In general, first test set 102 may continuously send test traffic through NUT 104 via communication line 118, and monitor the traffic output from NUT 104 via communication line 120. First test set 102 may be configured to detect the start of a service disruption and to detect when the service disruption has been cleared. Based on these two pieces of information, first test set 102 may determine and report a service disruption interval.

Figure 2:
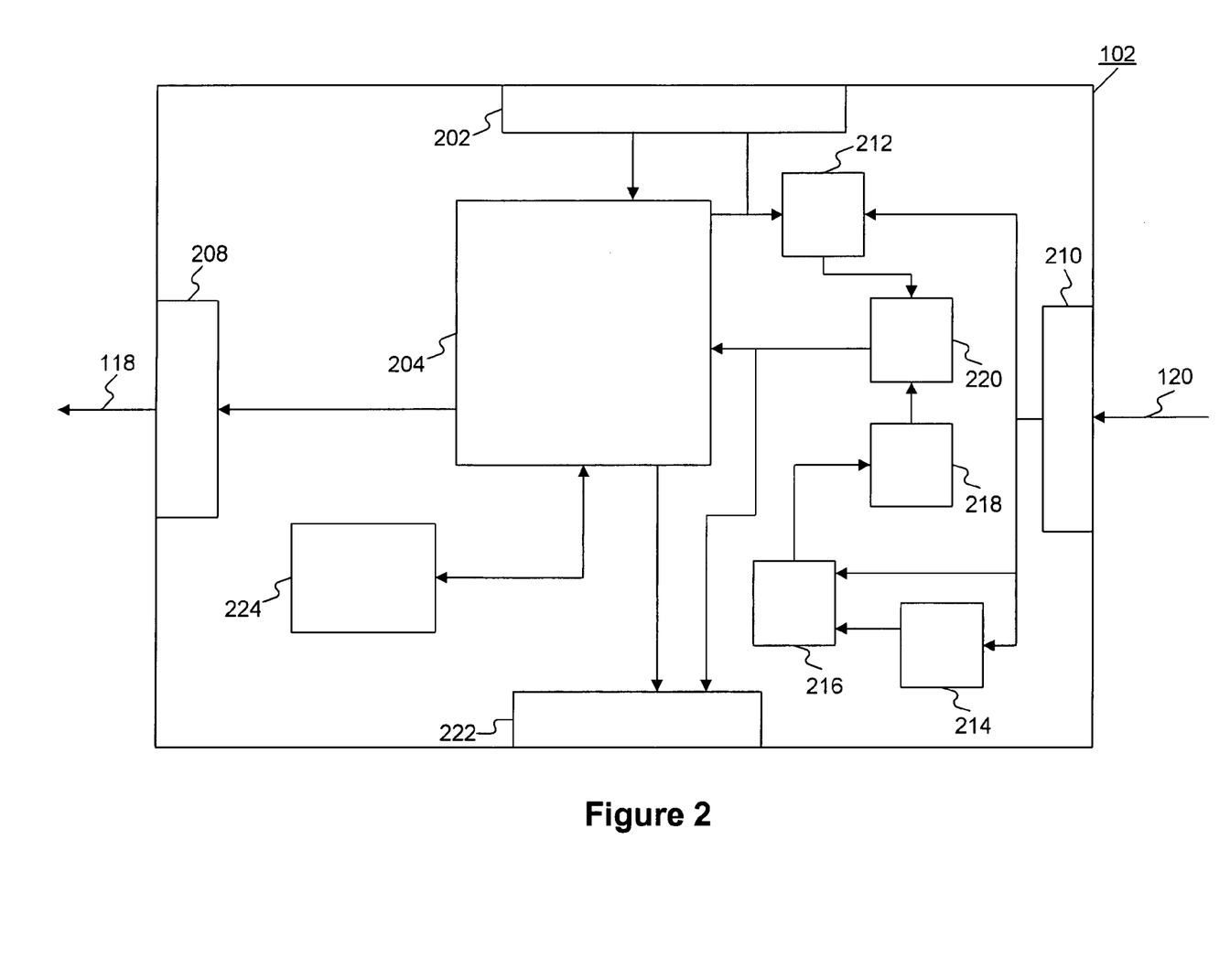
FIG. 2 is a block diagram representation of an exemplary test set consistent with the first embodiment.

FIG. 2 shows a more detailed representation of first test set 102 consistent with the first embodiment. First test set 102 may included a setting component 202, a generating component 204, a first output component 208, a receiving component 210, a service disruption start time designator 212, a settling start time designator 214, a settling period designator 216, a service disruption end time designator 218, a service disruption interval designator 220, a second output component 222, and a memory component 224.

Setting component 202 may be connected to service disruption start time designator 212, generating component 204, or both. Setting component 202 may be configured to set a high threshold equal to a bit-error rate threshold of a network element, such as, either of network elements 108 or 110. In setting the high threshold, setting component 202 may receive as an input, a user-entered signal to set the high threshold. For example, setting component 202 may be a control terminal, and may receive user inputs to set the high threshold value. Setting component 202 may receive a user's input by any appropriate manner well known, such as a touch-sensitive liquid crystal display recognizing user input, control knobs, buttons, etc. Setting component 202 may output a signal indicating the high threshold desired by the received user input to service disruption start time designator 212, generating component 204, or both. In addition, the set high threshold may be stored in generating component 204, stored in memory component 224, or output to second output 222.

Generating component 204 may be connected to first output 208, setting component 202, service disruption start time designator 212, service disruption interval designator 220, and second output component 222. Generating component 204 may generate a test signal, which may be supplied to first output component 208. Preferably, the generated test signal is supplied to NUT 104 via communication line 118. The generated test signal may include test traffic configured for transmission over optical transport networks. Generating component 204 may comprise a processor, and in certain applications, generating component 204 may comprise software components executable on a processor.

First output 208 may be connected generating component 204, and may be configured to receive output the generated test signal. First output 208 may supply the generated test signal to NUT 104 via communication line 118.

Receiving component 210 may be connected to service disruption start time designator 212, settling start time designator 214, and settling period designator 216. Receiving component 210 may be configured to receive the test signal. Preferably, receiving component 210 receives the test signal from an output of NUT 104 via communication line 120. In addition, receiving component 210 may receive a test signal exhibiting a bit-error rate.

Service disruption start time designator 212 may be connected to setting component 202, generating component 204, receiving component 210, service disruption interval designator 220, service disruption end time designator 218, and settling start time designator 214. Service disruption start time designator 214 may receive at a first input, a signal from either setting component 202 or generating component 204. The received signal may indicate the threshold that setting component 202 received as an input to set the high threshold. Preferably the high threshold is set to the bit-error rate threshold of a network element in NUT 104. The received signal to set the high threshold may set the high threshold in service disruption start time designator 214. Service disruption start time designator 214 may receive at a second input, the test signal from receiving component 210, where the test signal preferably exhibits a bit-error rate. Service disruption start time designator 214 may be configured to designate, as the start time of a service disruption, a time when the bit-error rate of the received test signal exceeds the high threshold set by setting component 202. Service disruption start time designator 214 may supply the designated start time to service disruption interval designator 220.

Settling start time designator 214 may be connected to receiving component 210, settling period designator 216, and service disruption start time designator 212. Settling start time designator 214 may be configured to designate the start time of a measured settling period. Specifically, settling start time designator may designate, as the start time of a measured settling period, a time when the bit-error rate of the received test signal falls to a pre-set low threshold. In designating the start time, settling start time designator 214 may receive an input from receiving component 210. The signal received from receiving component 210 may be the test signal exhibiting a bit-error rate. Settling start time designator 214 may output the designated start time of the measured settling period. Preferably, settling start time designator 214 may supply the designated start time of the measured settling period to settling period designator 216.

Settling period designator 216 may be connected to receiving component 210, settling start time designator 214, and service disruption end time designator 218. Settling period designator 216 may be configured to designate and output the measured settling period. Specifically, settling period designator 216 may designate the measured settling period as a time period from the start of the settling period to a time period during which the received bit-error rate remains equal to or below the pre-set low threshold. Settling period designator 216 may receive as inputs, the start time of the measured settling period from settling start time designator 214 and the test signal from receiving component 210. In response these two input signals, settling period designator 216 may determine a settling period time period. Settling period designator 216 may determine a settling time period by any suitable known means. Settling period designator 216 may output the determined settling period time period. Preferably settling period designator 216 outputs the settling period time period to service disruption end time designator 218.

Service disruption end time designator 218 may be connected to settling period designator 216 and service disruption interval designator 220. Service disruption end time designator 218 may be configured to designate and output an end time of the service disruption. Specifically, service disruption end time designator 218 may receive from settling period designator 216 a signal indicating the measured settling period. Service disruption end time designator 218 may designate, as the end time of the service disruption, a time when the measured settling period reaches a pre-set settling period. Preferably, service disruption end time designator 218 supplies the designated end time of the service disruption to service disruption interval designator 220.

Service disruption interval designator 220 may be connected to generating component 204, service disruption start time designator 212, service disruption end time designator 218, and second output component 222. Service disruption interval designator 220 may designate and output the service disruption interval. Specifically, service disruption interval designator 220 may designate, as a determined service disruption interval, the time difference between the service disruption start time and the service disruption end time. In designating the service disruption interval, service disruption end time designator 220 may receive as inputs, the service disruption end time from service disruption end time designator 218 and the service disruption start time from service disruption start time designator 212. Service disruption interval designator 220 may determine the service disruption interval using the received service disruption start and end times. Service disruption interval designator 220 can determine the service disruption interval by subtracting the start time from the end time. Service disruption interval designator 220 may supply the designated service disruption interval to generating component 204, second output component 222, or both. Generating component 204 may store the designated service disruption interval in internal memory send the designated service disruption interval to memory component 224 for storage.

Memory component 224 may be connected to generating component 204. Memory component 224 may be any appropriate type of memory component, including, but not limited to ROM, PROM, RAM, EEPROM, Flash, etc. Memory component 224 may receive and store designated service disruption intervals from processor 204. Memory component 224 may also supply stored service disruption intervals to generating component 204.

Second output component 222 may be connected to generating component 204 and service disruption interval designator 220. Second output component 222 may be configured to receive and output the determined service disruption interval. Second output component 222 may receive the designated service disruption interval from generating component 204 or service disruption designator 220. Second output component 222 may output the service disruption interval by any appropriate way as is well known. For example, second output component 222 may output the designated service disruption interval in a viewable format, such as on an LCD monitor.

Figure 3:
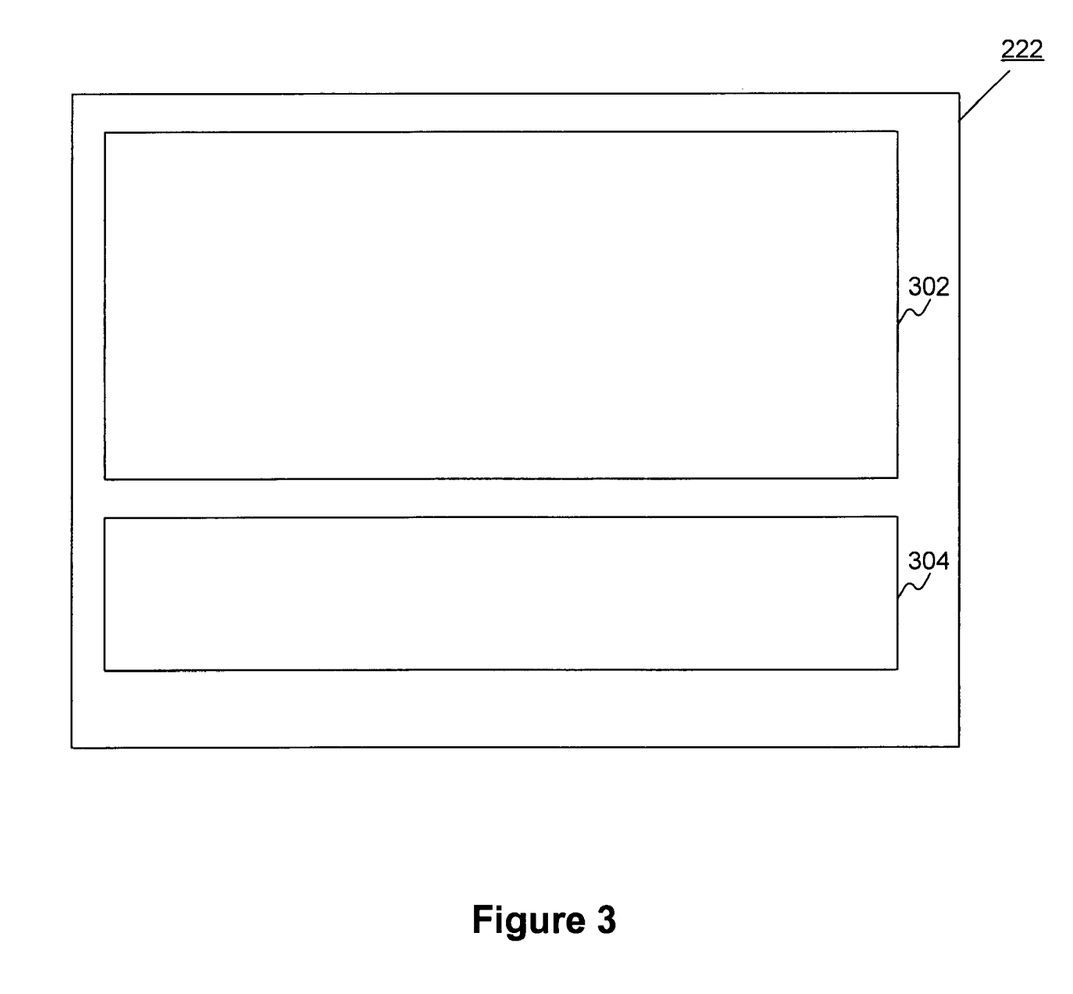
FIG. 3 is a block diagram representation of an exemplary control terminal consistent with the first embodiment.

FIG. 3 illustrates an exemplary embodiment of second output component 222. Second output component 222 may include a display 302 and a control panel 304. Display 302 may be any well known appropriate display, such as a liquid crystal display, CRT, etc. Display 302 may display any information relevant to the operation of test set 102, such as the determined service disruption interval or the value set for the high threshold. Control panel 304 may receive user inputs, such as to set the bit-error rate threshold. Control panel 304 may receive inputs by any suitable manner as is well known, such as a touch-sensitive liquid crystal display recognizing user inputs, control knobs, buttons, etc.

Figure 4:
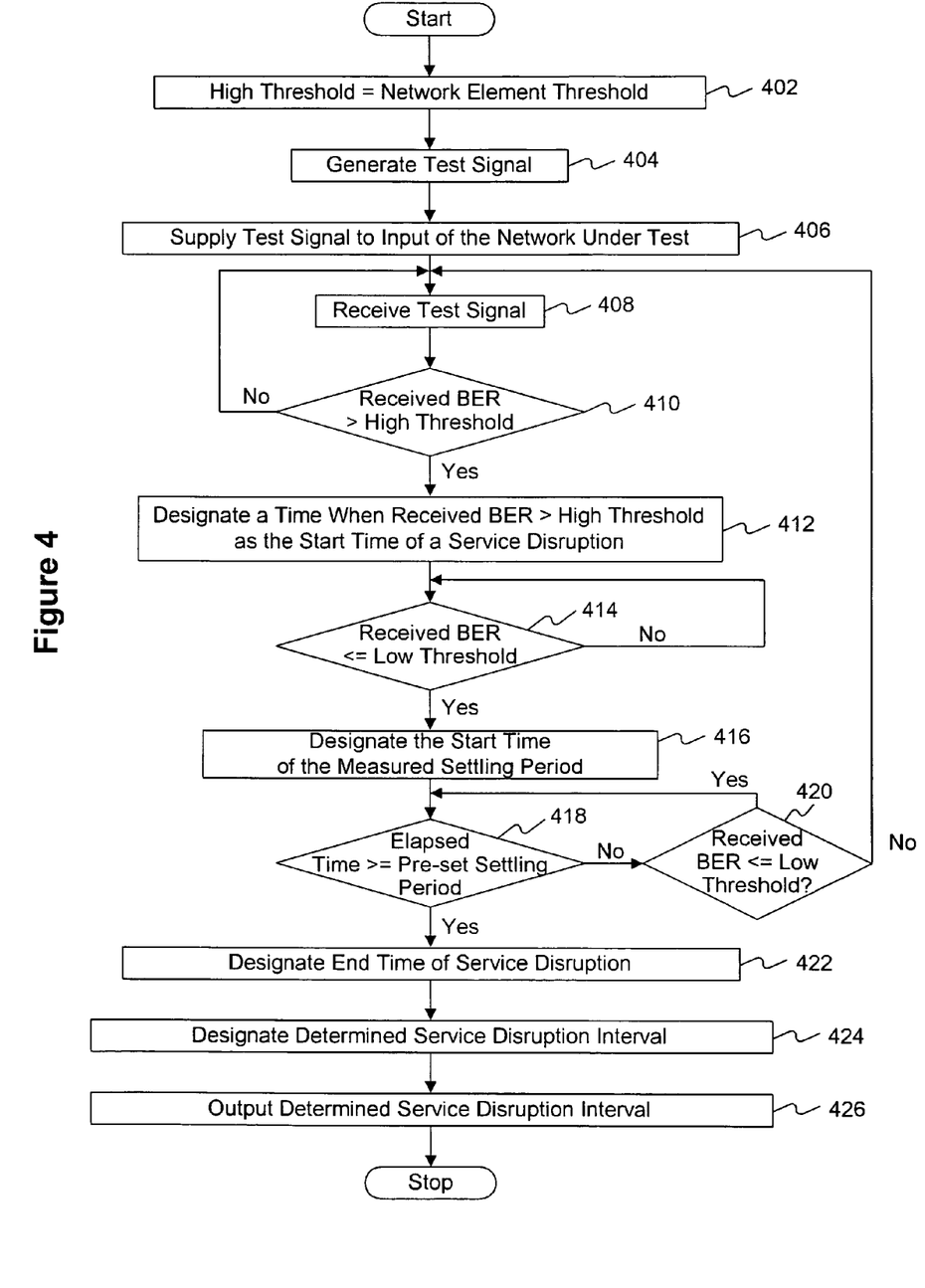
FIG. 4 is a flowchart illustrating an exemplary method consistent with the first embodiment.

FIG. 4 shows a flow chart depicting a method consistent with the first embodiment. Control may begin with step 402. Step 402 may represent setting a high threshold equal to a bit-error rate threshold of a network element in a NUT. Preferably, test set 102 may receive a user's input to set the bit-error rate threshold equal to the bit-error rate threshold of either of the network elements 108 or 110. Test set 102 may receive the user's input to select the bit-error threshold at setting component 202.

Step 404 may represent generating a test signal. Generating component 204 in test set 102 may generate a test signal. Generating component 204 may supply the generated test signal to first output component 208. Preferably, the generated test signal exhibits a bit-error rate below a low threshold. Generating component 204 may generate the test signal by any appropriate manner as is well known.

Step 406 may represent outputting the generated test signal. Preferably, step 406 supplies the generated test signal to an input of NUT 104 via communication line 118. First output component 208 may receive the generated test signal and supply the test signal to NUT 104.

Step 408 may represent receiving the test signal. The received test signal may exhibit a bit-error rate (preferably introduced by second test set 106). Receiving component 210 may receive the test signal exhibiting a bit-error rate from an output of NUT 104. Receiving component 210 may then supply the received test signal to service disruption start designator 212, settling start time designator 214, and settling period designator 216.

Step 410 may represent determining whether the bit-error rate of the received test signal exceeds the high threshold. Service disruption start designator 212 may determine whether the received test signal exhibiting the bit-error rate exceeds the threshold set by either generating component 204 or setting component 202. Service disruption start designator 212 may continuously evaluate the two received signals to determine whether the bit-error rate in the test signal exceeds the high threshold. If the bit-error rate in the test signal does not exceed the high threshold, control may return back to step 408. When the bit-error rate in the test signal exceeds the high threshold, control may proceed to step 412.

At step 412, service disruption start designator 212 may designate, as the start time of a service disruption interval, a time when the bit-error rate in the received test signal first exceeds the high threshold. Service disruption start time designator 212 may supply the designated start time of the service disruption interval to service disruption interval designator 220. Control may then proceed to step 414.

Step 414 may represent determining whether the bit-error rate falls to a pre-set low threshold. If the bit-error rate has not fallen to the pre-set low threshold, control may repeat step 414. If the bit-error rate has fallen to the pre-set low threshold, control may proceed to step 416. Settling start time designator 214 may determine whether the bit-error rate falls to the pre-set threshold. Settling start time designator 214 can make this determination by any appropriate means and methods as are well known.

Step 416 may represent designating the start time of a measured settling period. More specifically, if the settling start time designator 214 determines that the bit-error rate falls to the pre-set threshold, settling start time designator 214 may designate the start of the measured settling period as the time when the bit-error rate first fell to the pre-set low threshold. Settling start time designator 214 may supply the designated start of the measured settling period to settling period designator 216. Control may then proceed to step 418.

Steps 418 and 420 may represent designating a measured settling period. At step 418, settling period designator 216 may determine whether a time elapsed since the start time of the measured settling period reaches a pre-set settling period. If the elapsed time does not reach the pre-set settling period, control may proceed to step 420. At step 420, the bit-error rate of the received test signal may be compared to the low threshold to see if the bit-error rate is less than or equal to the low threshold. If the bit-error rate is less than or equal to the low threshold, control may then proceed back to step 418. If, however, the bit-error rate is not less than or equal to the low threshold, control may go back to step 408. For example, settling period designator 216 may monitor a time since the start of the settling period to determine whether the time has reached a pre-set settling period. If the settling period designator 216 determines that the time has not reached the pre-set settling period, control may proceed to step 420. If the settling period designator 216 determines that the time has reached the pre-set settling period, control proceeds to step 422.

Once the elapsed time reaches the pre-set settling period, control proceeds to step 422, where service disruption end time designator 218 may designate the end time of the service disruption. Specifically, service disruption end time designator 218 may designate as the end time, a time when the measured settling period reaches the pre-set settling period. Service disruption end time designator 218 may supply the designated service disruption end time to service disruption interval designator 220. Control may then proceed to step 424.

Step 424 may represent designating the service disruption interval. Service disruption interval designator 220 receives a service disruption start time from service disruption start time designator 212 and a service disruption end time from service disruption end time designator 218. Service disruption interval designator 220 may determine the service disruption interval using the start and end times. Service disruption interval designator 220 may determine the service disruption interval based on the time difference between the service disruption start time and end time, which may be ascertained by subtracting the end time from the start time.

At step 426, Service disruption interval designator 220 may supply the determined service disruption interval to generating component 204, second output component 222, or both. Second output component 222 may output the determined service disruption interval as described above.

Figure 5:
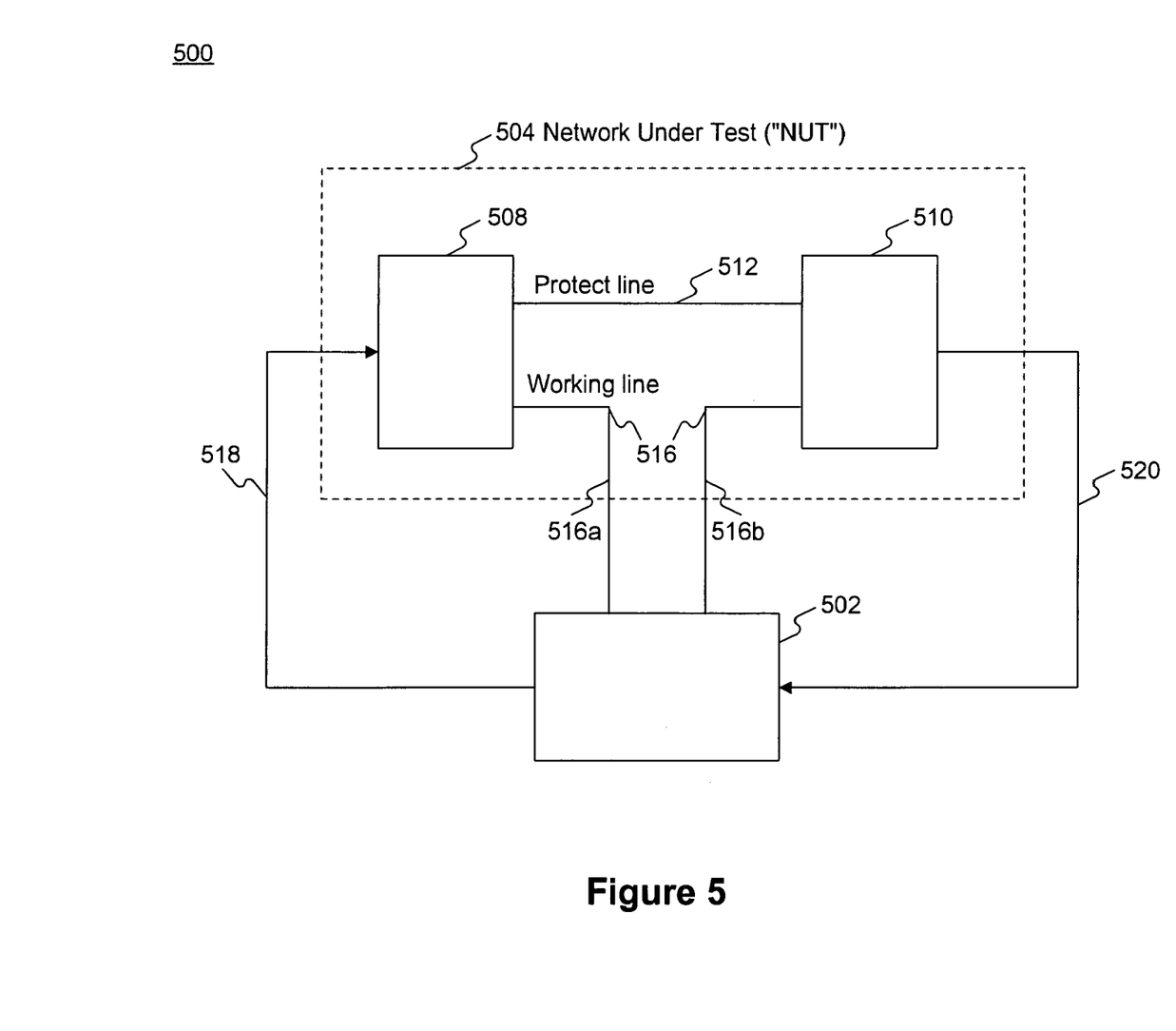
FIG. 5 is a block diagram representation of a network under test and test set consistent with a second exemplary embodiment.

FIG. 5 shows a block diagram representation of a system 500 consistent with a second exemplary embodiment. System 500, may include a test set 502; communication lines 518 and 520; and a NUT 504, that may include network elements 508 and 510, two optically protected lines 512 and 516. Network elements 508 and 510 may be provisioned such that there is a circuit between them carrying traffic, such as the optically protected line. Optically protected line 512 may be a "protect" line (which may take over carrying traffic when the working line is unavailable for any reason) and optically protected line 516 may be a "working" line (which generally carries traffic). The NUT 504 in FIG. 5 is preferably an optical transport network, such as metropolitan optical networks ("MONs") or long haul optical networks ("LHONs"), and may include two network elements. NUT 504 may however, include other, or additional network components. Examples of other network components include, but are not limited to SONET/SDH add-drop multiplexers, dense wave division multiplexing ("DWDM") terminals and add-drop multiplexers, multi-service provisioning platforms ("MSPPs"), multi-function access devices ("MFADs"), etc. NUT 504 may also be used with other networks, such as networks based on free-space optics.

In the configuration of FIG. 5, test set 502 is connected to NUT 504 via optical communication lines 518 and 520. However, communication between test set 502 and NUT 504 is not limited to optical transmission lines, but may be performed by any suitable well known means, including, but not limited to, electrical communication, such as DS-1/DS-3 or 10/100/1000 Gbps Ethernet.

Test set 502 shown in FIG. 5 may be connected to network elements 508 and 510 via working line 516. In a preferred exemplary embodiment, working line 516 may include a first working line portion 516a and a second working line portion 516b. A first end of first working line portion 516a may be connected to an output of network element 508 and a second end of first working line portion 516a may be connected to a second input of test set 502. Furthermore, a first end of second working line portion 516b may be connected to a second output of test set 502 and a second end of second working line portion 516b may be connected to an input of network element 510. Referring back to the first embodiment, second test set 106 generated malfunction conditions (such as bit errors) on the working line 116. In the second exemplary embodiment, however, test set 502 may generate malfunction conditions, including bit-errors, on working line 516. Thus, test set 502 may now generate the malfunction condition and the test signal.

Figure 6:
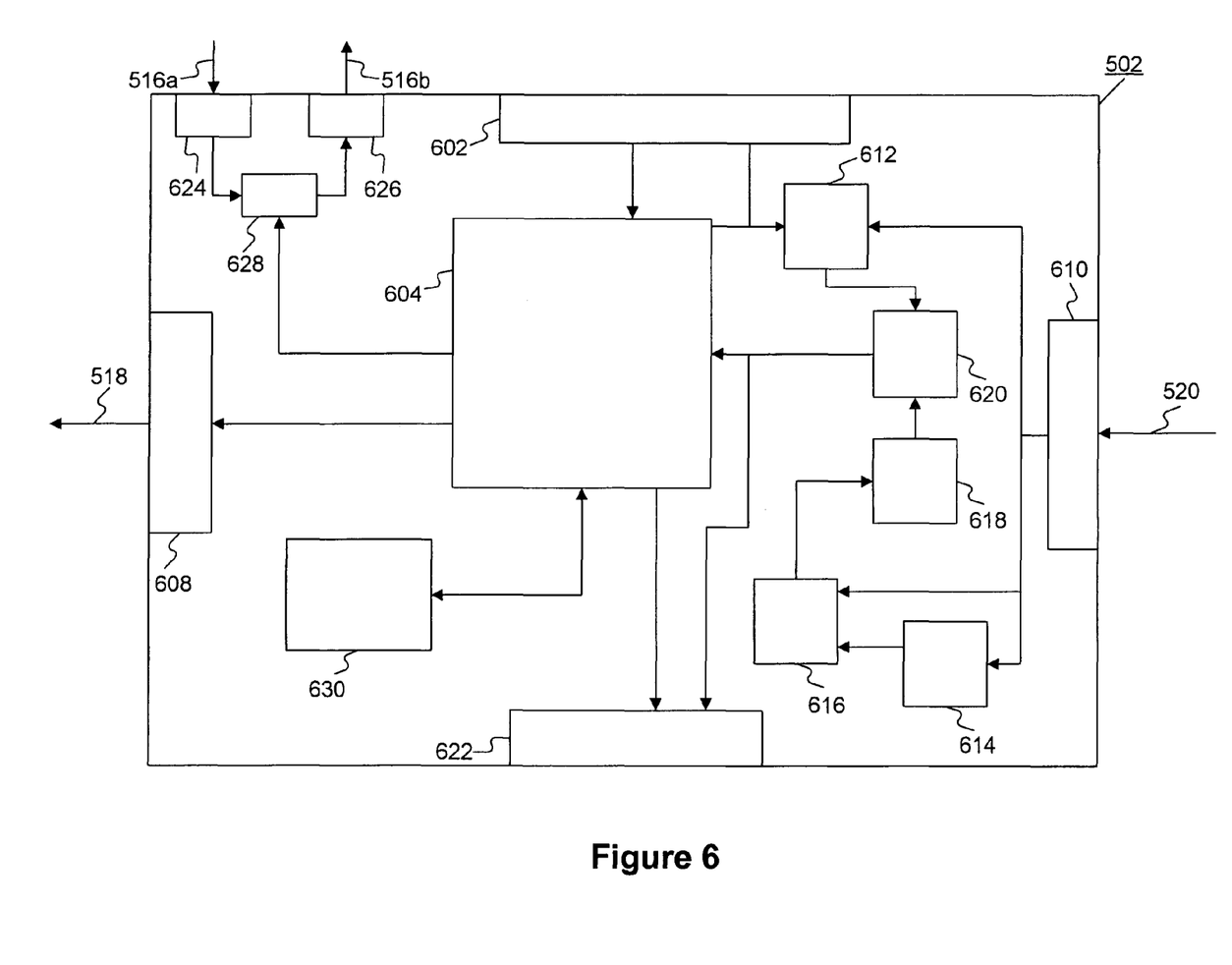
FIG. 6 is a block diagram representation of an exemplary test set consistent with the second embodiment.

FIG. 6 shows a detailed representation of test set 502 consistent with the second embodiment. Test set 502 may include a setting component 602, a first generating component 604, a first output component 608, a first receiving component 624, a malfunction generating component 604, a second generating component 628, a second output component 626, a second receiving component 610, a service disruption start time designator 612, a settling start time designator 614, a settling period designator 616, a service disruption end time designator 618, a service disruption interval designator 620, a third output component 622, and a memory component 630.

Setting component 602 may be connected to service disruption start time designator 612, first generating component 604, or both. Setting component 602 may be configured to set a high threshold equal to a bit-error rate threshold of either of network elements 508 or 510. In setting the high threshold, setting component 602 may receive as an input, a signal to set the high threshold. For example, setting component 602 may be a control terminal, and receive a user inputs to set the high threshold value. Setting component 602 may receive a user's input by any appropriate manner as is well known, such as a liquid crystal display recognizing user inputs, control knobs, buttons, etc. Setting component 602 may output a signal indicating the high threshold set by the received user input to service disruption start time designator 612, first generating component 604, or both. In addition, the set high threshold may be stored in first generating component 604, stored in memory component 630, or output to third output component 622.

First generating component 604 may be connected to first output 608, setting component 602, service disruption start time designator 612 service disruption interval designator 620, and third output component 622. First generating component 604 may generate a test signal, which may be supplied to first output component 608. Preferably, the generated test signal is supplied to NUT 504 via 518. The generated test signal may include test traffic configured for transmission over optical transport networks. First generating component 604 may be any suitable processor. Test traffic may be, for example, DS-1/DS-3 or 10/100/1000 Gbps Ethernet, OC-3112/48/1921768 for SONET, or STM-1/4/16164/256 for SDH.

First output 608 may be connected to first generating component 604. First output 608 may be configured to receive the generated test signal from first generating component 604. First output 608 may supply the generated test signal to NUT 504 via communication line 518.

First receiving component 624 may be connected to second generating component 628 and a first working line portion 516a. First receiving component 624 may receive and output the test signal received from an output of NUT 504. Preferably the received test signal may have a bit-error rate below a low threshold. First receiving component 624 may output the received test signal to second generating component 628.

Second generating component 628 may be connected to first receiving component 624 and second output component 626. Second generating component 628 may receive the test signal from first receiving component 624 and a malfunction generating component (also element 604). The malfunction generating component, which may be a processor, can generate a malfunction by any appropriate means and methods as are well known. The generated malfunction may, for example, take the form of a bit-error rate. Second generating component 628 may introduce the generated malfunction into the received test signal to create a test signal exhibiting a bit-error rate. Second generating component 628 may create the test signal exhibiting the bit-error rate by any appropriate manner as is well known. Second generating component 628 may then supply the generated test signal exhibiting a bit-error rate to second output component 626.

Second output component 626 may be connected to second generating component 628 and second working line portion 516b. Second output component 626 may receive the test signal supplied by second generating component 628 and output the received test signal to second working line portion 516b of the NUT 504.

Second receiving component 610 may be connected at least to service disruption start time designator 612, settling start time designator 614, and settling period designator 616. Second receiving component 610 may be configured to receive the test signal. Preferably, second receiving component 610 receives the test signal from an output of NUT 504 via communication line 520. In addition, receiving component 610 may receive a test signal exhibiting a bit-error rate.

Service disruption start time designator 612 may be connected to setting component 602, first generating component 604, second receiving component 610, service disruption interval designator 620, service disruption end time designator 618, and settling start time designator 614. Service disruption start time designator 614 may receive at a first input, a signal from either setting component 602 or first generating component 604. The received signal may indicate the signal that setting component 602 received as an input to set the high threshold. Preferably the high threshold is set to the bit-error rate threshold of a network element in NUT 504. The received signal to set the high threshold may set the high threshold in service disruption start time designator 614. Service disruption start time designator 614 may receive at a second input, the test signal from second receiving component 610, where the test signal preferably exhibits a bit-error rate. Service disruption start time designator 614 may be configured to designate, as the start time of a service disruption, a time when the bit-error rate of the received test signal exceeds the high threshold set by setting component 602. Service disruption start time designator 614 may supply the designated start time to service disruption interval designator 620.

Settling start time designator 614 may be connected to second receiving component 610, settling period designator 616, and service disruption start time designator 612. Settling start time designator 614 may be configured to designate the start time of a measured settling period. Specifically, settling start time designator may designate, as the start time of a measured settling period, a time when the bit-error rate of the received test signal falls to a pre-set low threshold. In designating the start time, settling start time designator 614 may receive an input from second receiving component 610. The signal received from second receiving component 610 may be the test signal exhibiting a bit-error rate. Settling start time designator 614 may output the designated start time of the measured settling period. Preferably, settling start time designator 614 may supply the designated start time of the measured settling period to settling period designator 616.

Settling period designator 616 may be connected to second receiving component 610, settling start time designator 614, and service disruption end time designator 618. Settling period designator 616 may be configured to designate and output the measured settling period. Specifically, settling period designator 616 may designate the measured settling period as a time period from the start of the settling period to a time period during which the received bit-error rate remains equal to or below the pre-set low threshold. Settling period designator 616 may receive as inputs, the start time of the measured settling period from settling start time designator 614 and the test signal from second receiving component 610. In response, settling period designator 616 may output a settling period time period. Preferably settling period designator 616 outputs the settling period time period to service disruption end time designator 618.

Service disruption end time designator 518 may be connected to settling period designator 616 and service disruption interval designator 620. Service disruption end time designator 618 may be configured to designate and output the an end time of the service disruption. Specifically, service disruption end time designator 618 may designate, as the end time of the service disruption, a time when the measured settling period reaches a pre-set settling period. Preferably, service disruption end time designator 618 supplies the designated end time of the service disruption to service disruption interval designator 620.

Service disruption interval designator 620 may be connected to first generating component 604, service disruption start time designator 612, service disruption end time designator 618, and second output component 622. Service disruption interval designator 620 may designate and output the service disruption interval. Specifically, service disruption interval designator 620 may designate, as a determined service disruption interval, the time difference between the service disruption start time and the service disruption end time. In designating the service disruption interval, service disruption end time designator 620 may receive as inputs, the service disruption end time from service disruption end time designator 618 and the service disruption start time from service disruption start time designator 612. Service disruption interval designator 620 may determine the service disruption interval using the received service disruption start and end times. Preferably, service disruption interval designator 620 may determine the service disruption interval by subtracting the start time from the end time. Service disruption interval designator 620 may supply the designated service disruption interval to first generating component 604, second output component 622, or both. First generating component 604 may store the designated service disruption interval in internal memory send the designated service disruption interval to memory component 630 for storage.

Memory component 630 may be connected to first generating component 604. Memory component 630 may be any appropriate type of memory component, including, but not limited to ROM, PROM, RAM, EEPROM, Flash, etc. Memory component 630 may receive and store designated service disruption intervals from first generating component 604. Memory component 630 may also supply stored service disruption intervals to first generating component 604.

Third output component 622 may be connected to first generating component 604 and service disruption interval designator 620. Third output component 622 may be configured to receive and output the determined service disruption interval. Third output component 622 may receive the designated service disruption interval from first generating component 604 or service disruption designator 620. Third output component 622 may output the service disruption interval by any appropriate way as is well known. For example, third output component 622 may output the designated service disruption interval in a viewable format, such as on an LCD monitor.

Figure 7:
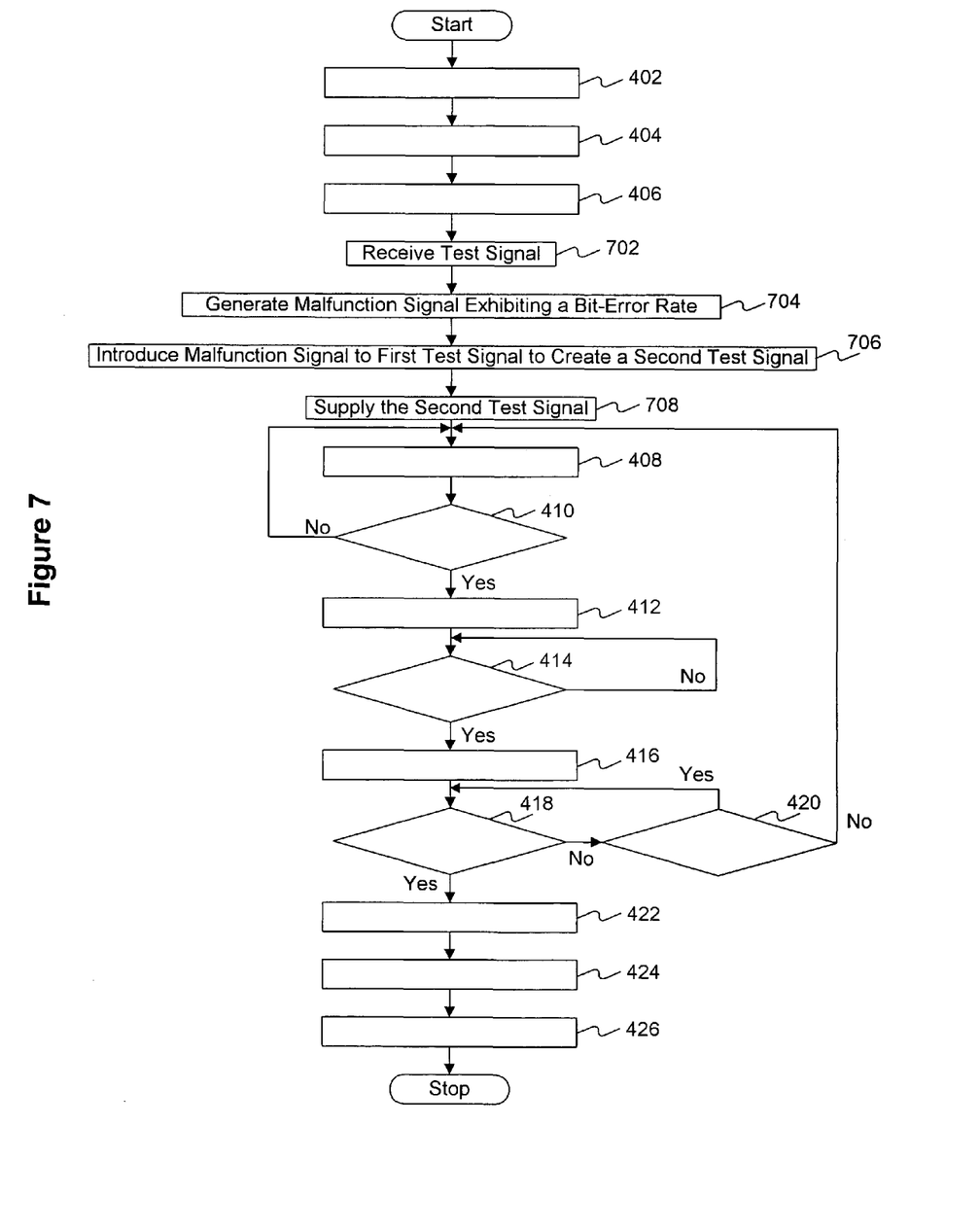
FIG. 7 is a flow chart illustrating an exemplary method consistent with the second embodiment.

FIG. 7 shows a flow chart depicting a method consistent with the second embodiment. This flow chart is similar to the flow chart for the first embodiment, but adds additional steps 702, 704, 706, and 708. Like in the first embodiment, the flow chart for the second embodiment may begin with step 402. Step 402 may represent setting a high threshold equal to a bit-error rate threshold of a network element in a NUT. Preferably, test set 502 may receive a user's input to set the bit-error rate threshold equal to the bit-error rate threshold of either of the network elements 508 or 510. Test set 502 may receive the user's input to select the bit-error threshold at setting component 602.

Step 404 may represent generating a test signal. First generating component 604 in test set 502 may generate a test signal. First generating component 604 may supply the generated test signal to first output component 608. Preferably, the generated test signal exhibits a bit-error rate below a low threshold. First generating component 604 may generate the test signal by any appropriate manner as is known.

Step 406 may represent outputting the generated test signal. Preferably, at step 406, first output component 608 may supply the generated test signal to an input of NUT 504 via communication line 518. First output component 608 may receive the generated test signal and supply the test signal to NUT 504. Control may then proceed to step 702.

Step 702 may represent receiving the first test signal from a first output of the network under test. For example, first receiving component 624 may receive the test signal from first working line portion 516*a*. Preferably the received test signal may not exhibit a bit-error rate above a low threshold. First receiving component 624 supplies the received test signal to second generating component 628. Control may then proceed to step 704.

Step 704 may represent generating a malfunction signal exhibiting a bit-error rate. Malfunction generating component 604 may be a processor, and may also generate a malfunction condition, such as a signal exhibiting a bit-error rate. Malfunction generating component 604 may supply the generated malfunction condition exhibiting a bit-error rate to second generating component 628. Control may then proceed to step 706.

Step 706 may represent introducing the malfunction condition generated by malfunction generating component 604 to the test signal received by first receiving component 624. Second generating component 628 may receive as inputs, the test signal received by first receiving component 624 and the malfunction condition exhibiting the bit-error rate from processor 604. Based on these two inputs, second generating component 628 may create a second test signal exhibiting the bit-error rate of the malfunction condition by combining the test signal received by first receiving component 624 and the malfunction condition received by processor 604. Second generating component 628 may combine the two signals to create the second test signal using any appropriate means as is well known. Control may then proceed to step 708.

Step 708 may represent supplying the second test signal to an input of NUT 504. Second output component 626 may receive the second test signal exhibiting the bit-error rate from second generating component 628. Second output component 626 may then supply the received test signal to second working line portion 516*b* of NUT 504. Control may then proceed to step 408.

Step 408 may represent receiving the test signal. The received test signal may exhibit a bit-error rate. Receiving component 610 may receive the test signal exhibiting a bit-error rate from an output of NUT 504. Receiving component 610 may then supply the received test signal to service disruption start designator 612, settling start time designator 614, and settling period designator 616.

Step 410 may represent determining whether the bit-error rate of the received test signal exceeds the high threshold. Service disruption start designator 612 may determine whether the received test signal exhibiting the bit-error rate and signals from either first generating component 604 or setting component 602 setting the high threshold. Service disruption start designator 612 may continuously evaluate the two received signals to determine whether the bit-error rate in the test signal exceeds the high threshold. If the bit-error rate in the test signal does not exceed the high threshold, control may return back to step 408. When the bit-error rate in the test signal exceeds the high threshold, control may proceed to step 412.

At step 412, service disruption start designator 612 may designate, as the start time of a service disruption interval, a time when the bit-error rate in the received test signal first exceeds the high threshold. Service disruption start time designator 612 may supply the designated start time of the service disruption interval to service disruption interval designator 620. Control may then proceed to step 414.

Step 414 may represent determining whether the bit-error rate falls to a pre-set low threshold. If the bit-error rate has not fallen to the pre-set low threshold, control may repeat step 414. If the bit-error rate has fallen to the pre-set low threshold, control may proceed to step 416. Settling start time designator 614 may determine whether the bit-error rate falls to the pre-set threshold. Settling start time designator 614 can make this determination by any appropriate means as is well known.

Step 416 may represent designating the start time of a measured settling period. More specifically, if the settling start time designator 614 determines that the bit-error rate falls to the pre-set threshold, settling start time designator 614 may designate the start of the measured settling period as the time when the bit-error rate first fell to the pre-set low threshold. Settling start time designator 614 may supply the designated start of the measured settling period to settling period designator 616. Control may then proceed to step 418.

Steps 418 and 420 may represent designating a measured settling period. At step 418, settling period designator 616 may determine whether a time elapsed since the start time of the measured settling period reaches a pre-set settling period. If the elapsed time does not reach the pre-set settling period, control may proceed to step 420. At step 420, the bit-error rate of the received test signal may be compared to the low threshold to see if the bit-error rate is less than or equal to the low threshold. If the bit-error rate is less than or equal to the low threshold, control may then proceed back to step 418. If, however, the bit-error rate is not less than or equal to the low threshold, control may go back to step 408. For example, settling period designator 616 may monitor a time since the start of the settling period to determine whether the time has reached a pre-set settling period. If the settling period designator 616 determines that the time has not reached the pre-set settling period, control may proceed to step 420. If the settling period designator 616 determines that the time has reached the pre-set settling period, control proceeds to step 422.

Once the elapsed time reaches the pre-set settling period, control proceeds to step 422, where service disruption end time designator 618 may designate the end time of the service disruption. Specifically, service disruption end time designator 618 may designate as the end time, a time when the measured settling period reaches the pre-set settling period. Service disruption end time designator 618 may supply the designated service disruption end time to service disruption interval designator 620. Control may then proceed to step 424.

Step 424 may represent designating the service disruption interval. Service disruption interval designator 620 receives a service disruption start time from service disruption start time designator 612 and a service disruption end time from service disruption end time designator 618. Service disruption interval designator 620 may determine the service disruption interval using the start and end times. Service disruption interval designator 620 may determine the service disruption interval by the time difference between the service disruption start time and end time, which may be ascertained by subtracting the end time from the start time.

At step 426, service disruption interval designator 620 may supply the determined service disruption interval to first generating component 604, third output component 622, or both. Third output component 622 may output the determined service disruption interval as described above.

Figure 8:
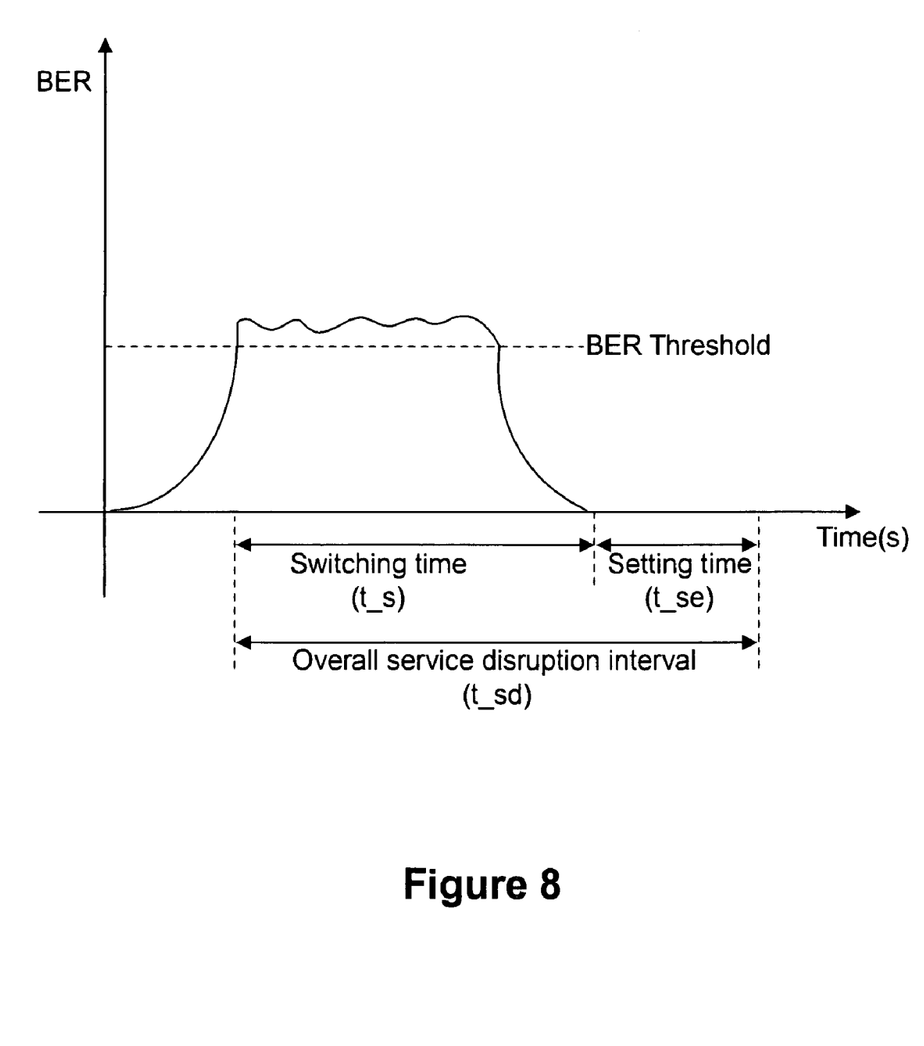
FIG. 8 is a representation of an exemplary service disruption interval measurement based on a bit-error rate exceeding a bit-error rate threshold.

FIG. 8 is a representation of an exemplary service disruption interval measurement based on a bit-error rate exceeding a bit-error rate threshold. Generally, the total service disruption interval, t_sd, is the time from when the bit-error rate first goes above the bit-error threshold until a time when the bit-error rate reaches a low threshold, zero in this case, plus a specific settling time period, t_se.

In the preceding specification, specific preferred exemplary embodiments have been described with reference to specific implementations thereof. It will, however, be evident that various modifications and changes may be made thereunto, and additional embodiments may be implemented, without departing from the broader spirit and scope of the invention as set forth in the claims that follow. The specification and drawings are accordingly to be regarded in an illustrative rather than restrictive sense.

What is claimed is:

1. A method comprising:
    setting a high threshold equal to a bit-error rate threshold of a network element in a network under test;
    generating a test signal;
    supplying the test signal to an input of the network under test;
    receiving the test signal, exhibiting a bit-error rate, from an output of the network under test;
    designating, as the start time of a service disruption, a time when the bit-error rate of the received test signal exceeds the high threshold;
    designating, as the start time of a measured settling period, a time when the bit-error rate of the received test signal falls to a pre-set low threshold;
    after the measured settling period start time, designating, as a measured settling period, a time period during which the received bit-error rate remains equal to or below the low threshold;
    designating, as the end time of the service disruption, a time when the measured settling period reaches a pre-set settling period;
    designating, as the determined service disruption interval, the time difference between the service disruption start time and the service disruption end time; and
    outputting the determined service disruption interval.

2. The method according to claim 1, wherein the network under test comprises an optical transport network.

3. The method according to claim 1, wherein outputting the determined service disruption interval further comprises:
    outputting the determined service disruption interval in a viewable format.

4. The method according to claim 1, wherein the method further comprises:
    upon receiving the test signal,
    determining whether the bit-error rate in the received test signal exceeds the high threshold; and
    so long as the bit-error rate does not exceed the high threshold, continuing to receive the test signal and determine whether the bit-error rate in the received test signal exceeds the high threshold, otherwise, proceeding to designate the start time of the service disruption.

5. The method according to claim 1, wherein the method further comprises:
    upon designating the start time of a service disruption, determining whether the bit-error rate has fallen to the pre-set low threshold; and
    so long as the bit-error rate does not fall to the pre-set low threshold, continuing to determine whether the bit-error rate has fallen to the pre-set low threshold, otherwise proceeding to designate the start time of the settling period.

6. The method according to claim 1, wherein the method further comprises:
    upon designating the start time of the settling period, determining whether a time elapsed since the settling period start time has reached the pre-set settling period; and
    so long as the time elapsed has not reached the pre-set settling period, determining whether the bit-error rate remains equal to or below the pre-set low threshold, otherwise proceeding to designate the end time of the service disruption.

7. The method according to claim 6, wherein determining whether the bit-error rate is less than or equal to the pre-set low threshold further comprises:
    if the bit-error rate remains less than or equal to the low threshold, returning to determine whether a time elapsed since the time designated as the settling period start time has reached the pre-set settling period, otherwise returning to receive the test signal, exhibiting a bit-error rate, from an output of the network under test.

8. An apparatus comprising:
    a setting component configured to set a high threshold equal to a bit-error rate threshold of a network element in a network under test;
    a generating component configured to generate a test signal;
    a first output component configured to supply the generated test signal to an input of the network under test;
    a receiving component configured to receive the test signal, exhibiting a bit-error rate, from an output of the network under test;
    a service disruption start time designator configured to designate, as the start time of a service disruption, a time when the bit-error rate of the received test signal exceeds the high threshold;
    a settling start time designator configured to designate, as the start time of a measured settling period, a time when the bit-error rate of the received test signal falls to a pre-set low threshold;
    a settling period designator configured to designate the measured settling period as a time period from the start time of the measured settling period to a time period during which the received bit-error rate remains equal to or below the low threshold;
    a service disruption end time designator configured to designate, as the end time of the service disruption, a time when the measured settling period reaches a pre-set settling period; and
    a service disruption interval designator configured to designate, as a determined service disruption interval, the time difference between the service disruption start time and the service disruption end time; and
    a second output component configured to output the determined service disruption interval.

9. The apparatus according to claim 8, wherein the network under test comprises an optical transport network.

10. The apparatus according to claim 8, wherein the second output component is further configured to output the determined service disruption interval in a viewable format.

11. The apparatus according to claim 8, further comprising:
    a high threshold checking component configured to determine whether the bit-error rate in the received test signal exceeds the high threshold, and send a signal to the service disruption start time designator to set the start of the service disruption interval if the bit-error rate exceeds the high threshold, otherwise, continuing to receive and determine whether bit-error rate exceeds the high threshold.

12. The apparatus according to claim 8, further comprising:
a low threshold checking component configured to determine whether the bit-error rate has fallen to the pre-set low threshold, and send a signal to the settling period designator to set the start of the settling period, otherwise, continuing to determine whether the bit-error rate has fallen to the pre-set low threshold.

13. The apparatus according to claim 8, further comprising:
a pre-set settling period checking component configured to determine whether a time elapsed since the settling period start time has reached the pre-set settling period, and sending a signal to a low threshold checking component to determine whether the bit-error rate has fallen to the pre-set low threshold, otherwise, sending a signal to the service disruption end time designator to set the end time of the service disruption.

14. The apparatus according to claim 13, further comprising:
if the bit-error rate is less than or equal to the pre-set low threshold the pre-set settling period checking component continues determining whether the time elapsed since the time designated as the settling period start time has reached the pre-set settling period, otherwise, the low threshold checking component sends a signal to the receiving component to continue receiving test signals.

15. A method comprising the steps of:
setting a high threshold equal to a bit-error rate threshold of a network element in a network under test;
generating a first test signal;
supplying the first test signal to a first input of the network under test;
receiving the first test signal from a first output of the network under test;
generating a malfunction signal exhibiting a bit-error rate;
combining the malfunction signal with the first test signal received from the first output of the network under test, to create a second test signal exhibiting the bit-error rate;
supplying the second test signal exhibiting the bit-error rate to a second input of the network under test;
receiving the second test signal, exhibiting a bit-error rate, from a second output of the network under test;
designating, as the start time of a service disruption, a time when the bit-error rate of the received second test signal exceeds the high threshold;
designating, as the start time of a measured settling period, a time when the bit-error rate of the received second test signal falls to a pre-set low threshold;
after the measured settling period start time, designating, as a measured settling period, a time period during which the received bit-error rate remains equal to or below the low threshold;
designating, as the end time of the service disruption, a time when the measured settling period reaches a pre-set settling period;
designating, as a determined service disruption interval, the time difference between the service disruption start time and the service disruption end time; and
outputting the determined service disruption interval.

16. The method according to claim 15, wherein the network under test comprises an optical transport network.

17. The method according to claim 15, wherein outputting the designated service disruption interval further comprises:
outputting the determined service disruption interval in a viewable format.

18. The method according to claim 15, wherein the method further comprises:
upon receiving the test signal from an output of the network under test,
determining whether the bit-error rate in the received test signal exceeds the high threshold; and
so long as the bit-error rate does not exceed the high threshold, continuing to receive the test signal and determine whether the bit-error rate in the received test signal exceeds the high threshold, otherwise, proceeding to designate the start time of the service disruption.

19. The method according to claim 15, wherein the method further comprises the steps of:
upon designating the start time of a service disruption, determining whether the bit-error rate has fallen to the pre-set low threshold; and
so long as the bit-error rate does not fall to the pre-set low threshold, continuing to determine whether the bit-error rate has fallen to the pre-set low threshold, otherwise proceeding to designate the start time of the settling period.

20. The method according to claim 15, wherein the method further comprises:
upon designating the start time of the settling period, determining whether a time elapsed since the time designated as the settling period start time has reached the pre-set settling period; and
so long as the time elapsed has not reached the pre-set settling period, determining whether the bit-error rate remains equal to or below the pre-set low threshold, otherwise proceeding to designate the end time of the service disruption.

21. The method according to claim 20, wherein determining whether the bit-error rate is less than or equal to the pre-set low threshold further comprises:
if the bit-error rate remains less than or equal to the low threshold, returning to determine whether a time elapsed since the time designated as the settling period start time has reached the pre-set settling period, otherwise returning to receive the test signal, exhibiting a bit-error rate, from an output of the network under test.

22. An apparatus comprising:
a setting component configured to a high threshold equal to a bit-error rate threshold of a network element in a network under test;
a first generating component configured to generate a first test signal;
a first output component configured receive the first test signal and supply the first test signal to a first input of the network under test;
a first receiving component configured to receive the first test signal from a first output of the network under test;
a malfunction generating component configured to generate a malfunction signal exhibiting a bit-error rate;
a second generating component configured to generate a second test signal exhibiting the bit-error rate;
a second output component configured to receive the second test signal and supply the second test signal, exhibiting the bit-error rate, to a second input of the network under test;
a second receiving component configured to receive the second test signal, exhibiting the bit-error rate, from a second output of the network under test;

a service disruption start time designator configured to designate, as the start time of a service disruption, a time when the bit-error rate of the received test signal exceeds the high threshold;

a settling start time designator configured to designate, as the start time of a measured settling period, a time when the bit-error rate of the received test signal falls to a pre-set low threshold;

a settling period designator configured to designate the measured settling period as a time period from the start time of the measured settling period to a time period during which the received bit-error rate remains equal to or below the low threshold;

a service disruption end time designator configured to designate, as the end time of the service disruption, a time when the measured settling period reaches a pre-set settling period; and a third output component configured to output, as a determined service disruption interval, the time difference between the service disruption start time and the service disruption end time.

23. The apparatus according to claim 22, wherein the network under test comprises an optical transport network.

24. The apparatus according to claim 22, wherein the third output component is further configured to output the determined service disruption interval in a viewable format.

25. The apparatus according to claim 22, further comprising:

a high threshold checking component configured to determine whether the bit-error rate in the received test signal exceeds the high threshold, and send a signal to the service disruption start time designator to set the start of the service disruption interval if the bit-error rate exceeds the high threshold, otherwise, continuing to receive and determine whether bit-error rate exceeds the high threshold.

26. The apparatus according to claim 22, further comprising:

a low threshold checking component configured to determine whether the bit-error rate has fallen to the pre-set low threshold, and send a signal to the settling period designator to set the start of the settling period, otherwise, continuing to determine whether the bit-error rate has fallen to the pre-set low threshold.

27. The apparatus according to claim 22, further comprising:

a pre-set settling period checking component configured to determine whether a time elapsed since the time designated as the settling period start time has reached the pre-set settling period, and sending a signal to a low threshold checking component to determine whether the bit-error rate has fallen to the pre-set low threshold, otherwise, sending a signal to the service disruption end time designator to set the end time of the service disruption.

28. The apparatus according to claim 27, further comprising:

if the bit-error rate is less than or equal to the pre-set low threshold, the pre-set settling period checking component continues determining whether the time elapsed since the time designated as the settling period start time has reached the pre-set settling period, otherwise, the low threshold checking component sends a signal to the receiving component to continue receiving test signals.

* * * * *